United States Patent
Marseille et al.

(10) Patent No.: US 8,965,299 B2
(45) Date of Patent: Feb. 24, 2015

(54) METHOD AND SYSTEM FOR THE PROCESSING CONTROL OF MULTIPLE RADIO FREQUENCY COMMUNICATION STREAMS BY AN INTEGRATED CIRCUIT CARD

(75) Inventors: François-Xavier Marseille, Marly le Roi (FR); Michel Thill, Les Clayes sous Bois (FR)

(73) Assignee: Gemalto SA, Meudon (FR)

( * ) Notice: Subject to any disclaimer, the term of this patent is extended or adjusted under 35 U.S.C. 154(b) by 168 days.

(21) Appl. No.: 13/703,982

(22) PCT Filed: Jun. 7, 2011

(86) PCT No.: PCT/EP2011/059408
§ 371 (c)(1),
(2), (4) Date: Dec. 13, 2012

(87) PCT Pub. No.: WO2011/157599
PCT Pub. Date: Dec. 22, 2011

(65) Prior Publication Data
US 2013/0090066 A1 Apr. 11, 2013

(30) Foreign Application Priority Data
Jun. 17, 2010 (EP) .................................... 10305652

(51) Int. Cl.
*H04B 17/00* (2006.01)
*H04B 7/00* (2006.01)
(Continued)

(52) U.S. Cl.
CPC .............. *H04B 7/26* (2013.01); *G07C 9/00111* (2013.01); *H04W 76/025* (2013.01)
USPC ..................... 455/67.11; 455/500; 455/552.1; 340/7.25; 340/10.3; 340/12.52

(58) Field of Classification Search
CPC .............. H04B 7/24; H04B 7/26; H04B 3/46; H04B 17/00; H04W 24/00
USPC ............... 455/425, 418, 41.2, 41.3, 500, 510, 455/517, 66.1, 67.11, 550.1, 552.1, 553.1, 455/556.1, 558; 340/5.2, 5.7, 5.8, 7.25, 340/10.3, 12.52
See application file for complete search history.

(56) References Cited

U.S. PATENT DOCUMENTS 6,308,317 B1 * 10/2001 Wilkinson et al. ............ 717/139
6,978,121 B1 12/2005 Lane et al.
(Continued)

FOREIGN PATENT DOCUMENTS

WO WO 02/44961 A1 6/2002

OTHER PUBLICATIONS

International Search Report (PCT/ISA/210) issued on Jul. 25, 2011, by the European Patent Office as the International Searching Authority for International Application No. PCT/EP2011/059408.
(Continued)

*Primary Examiner* — Andrew Wendell
(74) *Attorney, Agent, or Firm* — Buchanan Ingersoll & Rooney PC (57) ABSTRACT

The present invention relates to a method for processing a plurality of radiofrequency communication streams by way of an integrated circuit card, the streams originating from at least two terminals, and the card being connected to a device equipped with a radiofrequency communication interface which is suitable for the connection of a plurality of host terminals. The method includes monitoring the reception and/or transmission at and/or to the card of a first and second stream of data originating respectively from a first and second host terminal. The monitoring step includes a step of checking the availability of the card before the second stream of data is transmitted to the card. The invention also relates to the corresponding monitoring system and device.

12 Claims, 3 Drawing Sheets

(51) Int. Cl.
| | | |
|---|---|---|
| H04M 1/00 | (2006.01) | |
| G08B 5/22 | (2006.01) | |
| H04Q 1/30 | (2006.01) | |
| H04Q 5/22 | (2006.01) | |
| G05B 11/01 | (2006.01) | |
| G08C 19/16 | (2006.01) | |
| H04B 7/26 | (2006.01) | |
| G07C 9/00 | (2006.01) | |
| H04W 76/02 | (2009.01) | |

(56) References Cited

U.S. PATENT DOCUMENTS

| | | | |
|---|---|---|---|
| 2006/0181396 A1* | 8/2006 | Uchida et al. | 340/10.51 |
| 2007/0226549 A1* | 9/2007 | Anastasiadis et al. | 714/699 |
| 2007/0232358 A1 | 10/2007 | Sherman | |
| 2008/0192806 A1 | 8/2008 | Wyper et al. | |
| 2009/0020602 A1* | 1/2009 | Pratone | 235/380 |
| 2010/0144340 A1 | 6/2010 | Sudak | |
| 2010/0246465 A1* | 9/2010 | Cai et al. | 370/311 |
| 2010/0306346 A1* | 12/2010 | Anderson et al. | 709/220 |
| 2011/0016267 A1* | 1/2011 | Lee et al. | 711/103 |
| 2011/0162082 A1* | 6/2011 | Paksoy et al. | 726/26 |
| 2012/0155882 A1* | 6/2012 | Sheth et al. | 398/98 |
| 2013/0134216 A1* | 5/2013 | Spodak et al. | 235/380 |

OTHER PUBLICATIONS

Written Opinion (PCT/ISA/237) issued on Jul. 25, 2011, by the European Patent Office as the International Searching Authority for International Application No. PCT/EP2011/059408.

* cited by examiner

METHOD AND SYSTEM FOR THE PROCESSING CONTROL OF MULTIPLE RADIO FREQUENCY COMMUNICATION STREAMS BY AN INTEGRATED CIRCUIT CARD

The invention relates to a method and system for processing a plurality of radiofrequency communication streams by way of an integrated circuit card or by a secure object having integrated circuits. Distinct streams can come from at least two host terminals, the card being connected to a device equipped with radiofrequency communication means suitable for communicating with said terminals.

The invention relates particularly to the field of physical access control (for premises, buildings, etc.) and/or of logical access control (personal computer (PC), telephone, Personal Digital Assistant (PDA), networks, etc.) by means of integrated circuit cards or badges.

The invention is applicable in particular and in non-limiting manner in a badge holder device having an integrated circuit card interface and procuring secure access to facilities or equipment or to services via such facilities or equipment. The communicating authentication badge device is used as an example for illustrating the invention. However, any other device with its own energy source and having a radiofrequency communication interface may implement the invention described below.

In view of the multiplicity of terminals at the service of a user, the need has appeared for procuring logical access and/or secure logical access to such terminals at the same time by means of single integrated circuit object.

A principle of the invention is to provide means embedded in a portable device in software and/or hardware form, configured to enable two medium-range radiofrequency communication terminals to communicate with an integrated circuit object such as a smart card, i.e. a chip card, connected to the device.

More particularly, the invention makes provision to control the incoming and/or outgoing streams at the integrated circuit object. To this end, it includes electronic and/or software means making it possible:

to control or to process, in particular in sequences, a plurality of data streams (requests/commands) coming from the radiofrequency world (such as Bluetooth), so as to deliver them to the integrated circuit card for the purpose of having a plurality of security accesses to various terminals, e.g. to a personal computer and to a smartphone at the same time, by means a single smart card (e.g. a company badge) connected to a badge holder reader;

and to organize and/or manage the responses from the integrated circuit card so as to redirect them to the appropriate host terminal over a suitable channel (Bluetooth channel).

Depending on its various implementations, embodiments or characteristics and in order to perform the above-mentioned two operations, the invention preferably provides two types of Bluetooth architecture: one architecture having a single Bluetooth chip having a plurality of channels (depending on the number of Bluetooth terminals) or another architecture having a plurality of Bluetooth chips (one Bluetooth terminal per chip).

In a preferred embodiment, the invention makes provision to use the "multi-host" capacity of the Bluetooth chips (i.e. the capacity of a Bluetooth device to be connected as slave to a plurality of masters) and to add means for controlling and/or managing interchange of streams (in particular requests/commands/responses) so as to offer multiple accesses from one badge or the like.

It makes provision for partial and/or sequenced execution of the commands/requests (in particular Application Protocol Data Units (APDUs)). It preferably makes provision for data to be transmitted over logical channels (one per host) in order to procure multiple instantiation on one smart card. The invention preferably makes provision for the requests to be stored temporarily when a request from another host terminal is being processed by the integrated circuit card.

In addition, the invention also makes provision, in a preferred implementation, to control the stream flowing towards the Bluetooth chip(s) in such a manner as to redirect the responses to the appropriate host terminal. The invention may make provision to process a redirection step or redirection information in the control means, which step or information is optionally used subsequently by the radiofrequency chips. The responses from the card may be encapsulated so as to be redirected towards the appropriate host terminal, in particular when a single Bluetooth chip is used. When two Bluetooth chips are used, once one or the other of the Bluetooth chips has been selected by the stream controller, the response is directed automatically to the appropriate host terminal.

By means of these provisions, the invention offers the advantage of avoiding having to use a plurality of badges (one per access). Optionally, the control means may be independent from the Bluetooth chips in such a manner as to enable standard Bluetooth chips to be used without them needing to be altered.

The invention therefore firstly provides a method of controlling processing of a plurality of radiofrequency communication streams by an integrated circuit card, said streams coming from at least two terminals, said card being connected to a device equipped with radiofrequency communication means suitable for connecting to a plurality of host terminals, said method being characterized in that it includes the following step:

a reception and/or transmission control step for controlling reception of first and second data streams coming respectively from a first host terminal and from a second host terminal, and/or controlling transmission of them to the card, said control step including an availability checking step for checking whether the card is available before transmitting the second data stream to it.

In accordance with other characteristics:

The control step blocks the reset requests when the card is not available and organizes sending back a response (ATR) in the card's stead, thereby avoiding an operation that is undesired and/or disturbs a session in progress;

The method implements a control step for controlling the response from the card to the host terminal, thereby making it possible, in particular, to reach the appropriate terminal either via a format, a protocol, an address or an I/O port;

The response control includes, in particular, an operation of redirecting the response from the card to the corresponding transmitter host terminal;

A logical communication channel is assigned at each communication session opened with a host terminal or at each reception of a new stream, thereby making it possible, in particular to perform appropriate redirection of the response to the appropriate terminal;

When use is made of a single communication chip having a multi-host capacity, the method includes a step of keeping an indication of redirection in the communication chip;

When use is made of a plurality of communication chips, the method performs a step of keeping an indication of the origins of the streams;

The second stream from the terminal is transmitted in any event to the card after a determined time allotted for the response to the first stream from the terminal, thereby avoiding any blocking; Optionally, a reset request may be generated automatically for the card by the control means, or may be unblocked;

The control means may include a status register or a history of the streams transmitted to and/or received from the card in such a manner as to manage properly the streams in progress and/or awaiting processing by the card.

The invention also provides a system and a device corresponding to the method or designed for implementation thereof. The invention thus provides processing control device for controlling processing of a plurality of radiofrequency communication streams by an integrated circuit object, said device comprising or being designed to be connected to radiofrequency communication means configured for connecting to a plurality of host terminals that transmit said plurality of streams.

The device is remarkable in that it includes reception and/or transmission control means for controlling reception of first and second data streams coming respectively from a first host terminal and from a second host terminal, and/or controlling transmission of them to the card, said reception and/or transmission control means being configured to perform an availability check for checking whether the card is available before transmitting the second data stream to it.

Other characteristics and advantages of the present invention appear more clearly on reading the following description given with reference to the corresponding accompanying drawings, in which.

DETAILED DESCRIPTION OF THE INVENTION

Figure 1:
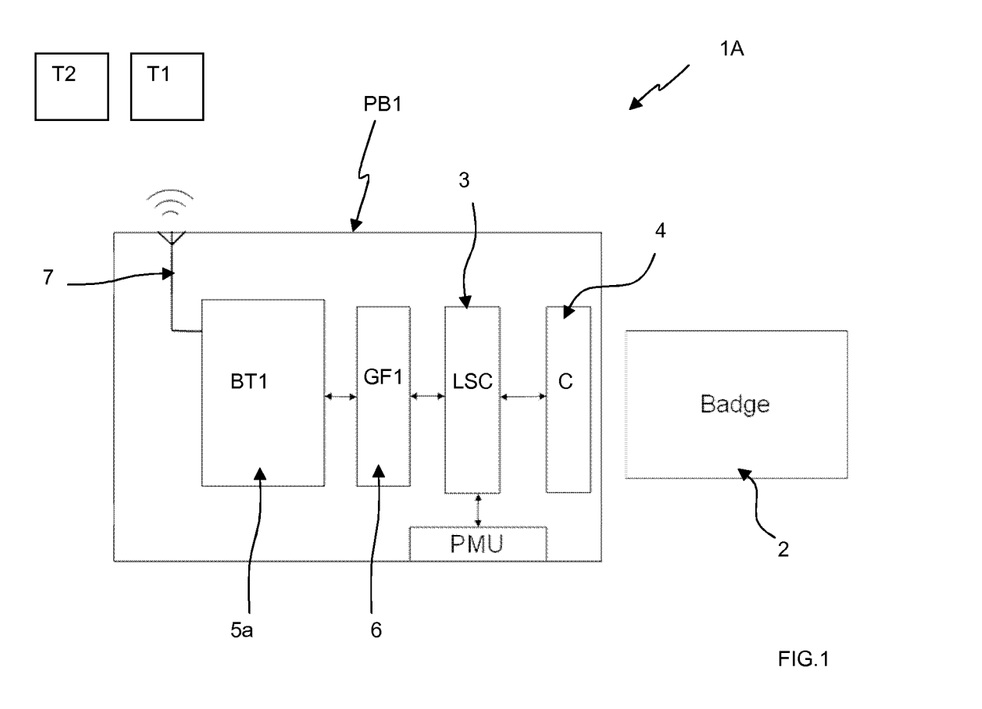
FIG. 1 is a view of a first embodiment of a communication system of the invention.

FIG. 1 shows a first embodiment of a system 1A of the invention. It has a badge holder device PB1 provided with a card reader (LSC, 3) that has a communicating interface with an identification object or a security object containing logical and/or physical access rights. In the example, the interface comprises an ISO 7816 interface and a connector C suitable for connecting to a badge 2, which, in this example, is in the form of a smart card having an electronic chip. Other types of badge and of corresponding interface are possible, such as USB memory sticks, dongles, contactless modules, Near Field Communication (NFC) means, and security components soldered inside the badge holder. In the description, the card used as an example may be replaced by any communicating secure object having integrated circuits. Similarly, the Bluetooth communication means may be replaced by any other radiofrequency communication means. In the description and claims, the word "smartcard" is thus equivalent to a "secure object having integrated circuits".

The badge holder PB1 is provided with at least one Bluetooth communication means (BT1, 5a). These means may include an integrated circuit chip or a Bluetooth processor. They may also include a microcontroller having an integrated Bluetooth communication module. The communication means (BT1) are connected to at least one physical interface including an antenna 7 and serve, in particular, to set up a communication with a host terminal T1 such as a computer and/or a printer, a personal assistant, a telephone, etc.

The badge holder also includes a Power Management Unit (PMU) and optionally an on/off switch (not shown).

The host terminal T1 also includes Bluetooth communication means and corresponding interface means. Although the communication is of the Bluetooth type in this example, it may be of any other type such as WiFi, ZigBee, or any other radiofrequency communication means of medium range, e.g. of range less than 500 meters (m) or indeed less than 100 m.

In this implementation of the invention, the communication in question serves to authorize use of all or some of the functions of the host terminal. For example, the communication is a session for establishing identification/authentication and/or presence of a right, in particular in a user's badge, making it possible to use the terminal, optionally in shared manner, or to gain logical access.

In the example, the device and the terminal may include means for implementing a step for initializing them or for pairing them with each other. This step enables the subsequent communication to be made secure and/or enables disturbances with other surrounding communications to be avoided. Pairing consists in a secret interchange of an encryption key or of an identifier between the portable object and the terminal in order to enable interchange to take place subsequently in encoded manner, or in order to recognize and to authorize a use of the terminal. It makes it possible to implement a secure logical channel between the terminal and the device.

In this example, this step is implemented via a pairing/initialization program or application contained in a programmable memory of the microcontroller, which in particular is a Bluetooth microcontroller (BT1, 5a) or a microcontroller using some other radiofrequency technology. The remote terminal T1 contains a corresponding program or software application in a suitable microcontroller.

The standardized procedures for initiating interchange, for organizing the sequence of interchange and for enabling the interchange to proceed are such that, currently, a contact smart card can undertake a communication session with only one host terminal at a time. With a view to solving that problem, the invention provides first means for receiving data and for transmitting it to the card, which means process a first data stream coming from a first host terminal, and second means for having the reader receive a second data stream coming from a second host terminal.

In this embodiment, these first and second means comprise a single Bluetooth chip and stream control means (stream and/or task planner or manager). In the example, the stream controller GF1 is placed in such a manner as to interface between the Bluetooth microcontroller BT1 of standard type and the reader portion LSC of the badge holder. The stream controller may be or may include a hardware and/or software component.

Also in the example, the stream controller (manager) GF1 includes a microcontroller $\mu$C1, an Electrically Erasable Programmable Read-Only Memory (EEPROM) program memory, and a Random Access Memory (RAM) working memory. It includes, in particular, a buffer memory MP serving to receive data streams coming from the various interchanges between the terminals and the badge and to make said data streams wait. Preferably, it includes a stream control program PCF1 for enabling the microcontroller μC1 to execute the functions or steps for controlling the streams or for executing various tasks.

It also preferably includes means for detecting and/or indicating an availability status of the card. These detection means may be implemented by an availability status register RE and or an interchange status register that can be informed continuously by the stream control manager GF1 in application of the program PCF1 described below.

For example, when a command is transmitted to the card, the stream controller puts a representative item of information or bit into the status register RE in order to show availability of the card. Conversely, when the card responds to the command or a request, this response goes through the manager, which is informed of the response and left to assume that the unavailability of the card has ended. This new status can be stored in a memory in the status register in the form of a corresponding item of information.

The stream controller GF1 preferably also includes means making it possible to know to which terminal the responses from the card should be sent back or redirected. To this end, the stream controller is capable of setting up one specific logical channel per terminal or per communication session or on receiving each stream.

For example, a channel is set up by taking an item of information from the transmitter, which item of information is contained in a particular field of the messages or request. The communication chip, in particular a Bluetooth chip, is capable of identifying over which channel it has received the request, and it sends the response over the same channel.

In order to set up a communication session, the streams may be encrypted with a pairing key for pairing between a terminal and the reader. In one form or another depending on the technology, the streams may include an indication of the transmitter in a portion of the stream.

When a Bluetooth chip is implemented, it is possible to use two different communication channels (e.g. two radiofrequency communications (RFCOMM) channels) that are explicitly managed/selected by the stream manager GF1 through commands of the Host Controller Interface (HCI) type that are used to communicate with the Bluetooth chip. In fact, in more detailed manner, the stream controller GF1 dialogues with the Bluetooth chip BT1 by using HCI commands. These commands make it possible, in particular, to address the appropriate RFCOMM channels so as to send back the appropriate data over them.

Thus, when the stream controller GF1 receives a request from the BT chip, it can access the request via an HCI command. Since each host terminal is associated with an RFCOMM channel, the stream manager GF1 identifies the host terminal as a function of the channel with which it is interacting by means of the HCI commands.

Then the stream controller GF1 sends the received request to the reader LSC by using an ISO logical channel associated with said host (optionally ramped if the host also uses other logical channels).

For the response, since only one command can be processed at a time by the card, it is possible to identify the host terminal to which the response should be returned. When the stream controller GF1 receives the response from the card, it knows which RFCOMM channel is the RFCOMM channel to which said response corresponds (because only one command is processed at a time and the commands are processed in a determined order). It can then use the HCI commands to send back the response over the appropriate RFCOMM channel.

In addition, as regards the logical channels complying with the ISO 7816 Standard, they are identifiable by the CLA field in the commands/responses of the APDU type. They make it possible to have selected applications that are different over each channel. A possibility used by the invention is to have a different channel used by each host, leading to separation of the execution contexts. Since one host is not aware of the presence of the other, and thus is not aware that the logical channels are being used to separate the execution contexts, the stream controller GF1 can manage the logical channels, in particular by associating each RFCOMM channel with an ISO channel.

It is important for the device to implement means or an application making it possible to send back a response from the card to the appropriate terminal. In one case, the response may be encrypted with the key corresponding to the key that made it possible to decrypt the streams transmitted to the card.

In order to manage the stream redirections properly, the manager may, when setting up or opening a communication channel, make provision to associate therewith the key(s), parameters, and specificities relating to host transmitter terminal or relating to the received data (e.g. encryption keys, parity, protocol, speed, or indicator, etc.).

Before transmitting a stream, a channel is set up or, alternatively, means serving to identify the transmitter are stored in a memory of the stream controller. Since no other stream is transmitted by the stream controller before the response is received from the card in the manager, the manager knows that the response should follow the same channel or the same protocol processing and/or security processing as the last data stream or data packet transmitted to the card.

In accordance with a characteristic of the invention, the data stream control means GF1 are suitable for or configured for managing or planning the interchanges between the card and at least two or more terminals.

In accordance with a characteristic of this embodiment, the device of the invention provides means making it possible to transmit a second data stream to the card for processing, which stream is coming from a second terminal, only when the card is available. This availability is deduced after detecting the response from the card to the data stream that was last transmitted to it. A detection of response from the card that is received firstly in the reader and is then received by the stream controller indicates assuredly an availability status for the card. This status is used by the invention as indicated below.

This response may also be received in a receive buffer memory of the manager that monitors the level of filling or of updating. The streams are managed in the buffer memories in conventional manner, e.g. preferably in First-In-First-Out (FIFO) type manner.

As soon as a data stream is received in the stream controller subsequently to a stream being sent to the card and fills a portion of buffer memory, the microcontroller μC1 detects it and enters an availability item of information in the status register RE. The microcontroller μC1 then proceeds to a following step in the method, in application of the corresponding program.

Alternatively, the availability information can come from the reader itself, e.g. by transmitting a specific signal for the stream controller GF1. The reader may manage an availability item of information for its own needs, and may share this information with the stream controller. Thus, the availability test shown in the figures may consist in verifying that an item of information has been received from the reader LSC and, in response to said item information, the stream controller knows when it can or cannot send the waiting streams or allow the future streams to pass. This information may be recorded in the same manner at the stream controller, e.g. in the status register. Optionally, the reader and the stream controller may constitute the same entity.

Another characteristic of the invention is that provision is made to manage the problem of reset requests coming from the host terminals. It is preferable to prevent systematic resetting when such resetting has already been performed by a first terminal during a preceding session. It is necessary to prevent resetting so long as a session with a terminal and made up of a plurality of interchanges is not fully finished, otherwise a portion of the processing of a session with another terminal might be erased.

To this end, the invention makes provision to keep in a memory a history of the interchanges and/or of the statuses of the sessions and/or of the resets, and to consult this history in such a manner as to prevent further resetting that might be imposed on the card when such resetting is not opportune or essential.

In the same way, a status register for the session (current or finished) may be informed and consulted systematically while the method of the invention is being implemented.

The invention thus provides means for managing reset requests made by the host terminals T1, T2. These means make it possible not only to prevent the reset but also to make the terminal believe that the reset has been performed by the card. These means, which are, in particular, in software form, may comprise a reset status register and means for generating and/or sending a message of the Answer To Reset (ATR) type identical to the message transmitted by the card. In an implementation, this message is sent, in particular, when the card is unavailable because it is processing and/or because a reset has been performed previously during a preceding session. In order to run as indicated above, the microcontroller µC1 executes a program that makes provision to consult one or more status register statuses or a register containing a history of the interchanges.

Figure 2:
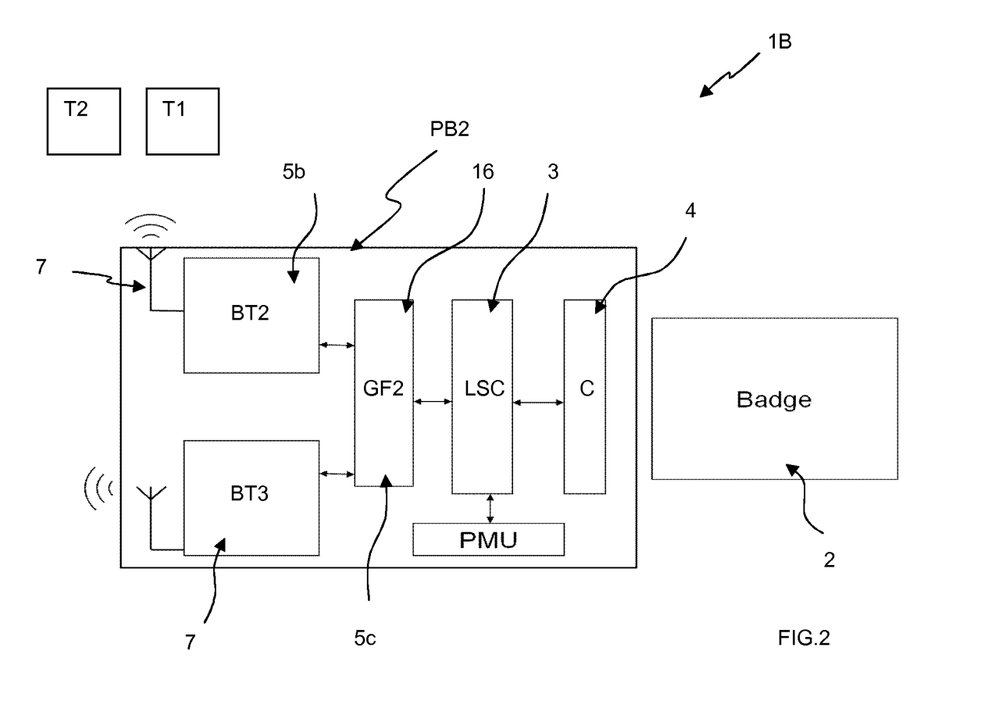
FIG. 2 is a view of a second embodiment of a communication system of the invention.

In the examples, the stream controllers GF1, GF2 have been added by interfacing between existing components (BT1, BT2 and reader LSC), which offers the advantage of immediate use. However, all or some of the functionality features and/or component parts of these stream controllers GF1/GF2 may be integrated in software and/or hardware form, in particular directly in the radiofrequency communication means. Similarly, all or some of the above-mentioned functionality features and/or component parts may be integrated in software and/or hardware form in the reader LSC or in a sub-portion of the communication device PB1, PB2 for communicating with a plurality of host terminals.

In FIG. 2, in another implementation, the communication device 1B includes means similar to the means of FIG. 1 except for the main difference that it includes two Bluetooth controllers BT2, BT3. The means of this device are identical to the means of the preceding figure when they bear the same reference numbers. This device uses at least two standard Bluetooth controllers, each of which has its own physical antenna 3.

The stream controller GF2 has two input/output ports for connecting each Bluetooth chip BT2, BT3. The stream controller GF2 includes substantially the same means as the stream controller GF1 and operates substantially in the same manner (microcontroller µC2, RAM, ROM, EEPROM, register, buffer memory, stream control program PCF2, selector for selecting the output port to the Bluetooth chips) except that it must direct the responses towards the appropriate Bluetooth controller in order to reach the appropriate transmitter terminal.

Each Bluetooth chip BT2, BT3 is suitable for connecting a single terminal T1, T2, respectively conversely to BT1. For this purpose, the stream controller GF2 may store in a memory an item of information relating to the first Bluetooth controller BT2 associated with the received stream and its order of any transmission (passing) to the card relative to another stream associated with the second Bluetooth controller BT3. The stream controller GF2 may associate with each stream either a port number or a Bluetooth controller and/or even an identifier for identifying the various terminals that are communicating.

Thus, by means of a sequential and ordered transmission of the streams or messages to the card in an order corresponding to the order of reception, the manager may associate the response from the card with the message previously transmitted to the card and assign a corresponding redirection depending on the terminal and/or controller that was associated with the incoming stream that was transmitted to the card last.

Figure 3:
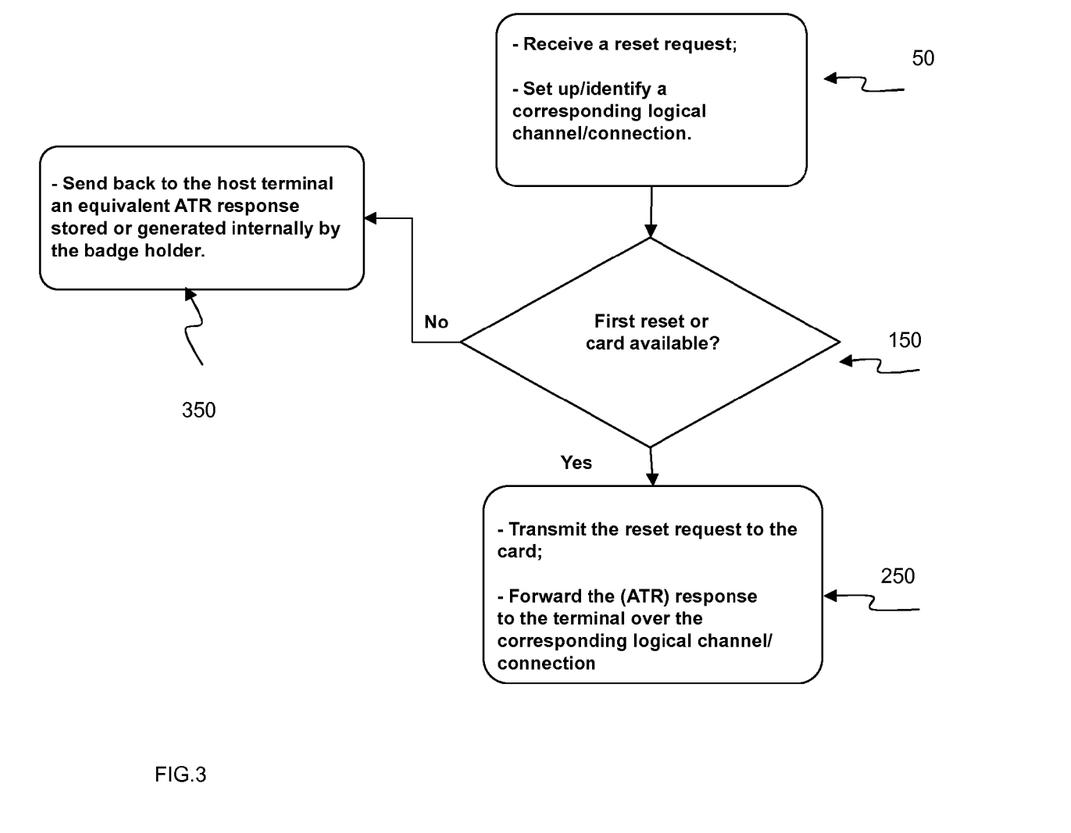
FIG. 3 shows the steps of the method of the invention relating to managing resetting in an implementation of the invention.

The flow chart of FIG. 3 shows how the radiofrequency communication devices PB1 operate as regards a management program PSET for the reset APDU requests and ATR response specific to the field of smart cards complying with the ISO 7816 Standard.

At step 50, a terminal T2 enters into communication with the badge holder PB1 in order to authorize T2 to be used. After preferably prior pairing, the reader PB1 receives from the terminal T2 a reset request for the card. This request is received and intercepted by the stream controller GF1. A logical channel and/or connection corresponding to this request is set up/identified or assigned by the stream controller GF1, and a terminal is associated therewith, in particular via an identifier.

In the following step 150, the program includes a test for determining whether a prior reset has already been performed after the card was switched on, and, if it has, the controller goes to step 250, and, if it has not, the controller goes to step 350.

In step 250, the program makes provision to transmit the reset request to the card and then to forward the ATR response to the terminal T2 over the corresponding logical channel/RFCOMM connection as soon as it is received. The badge holder is then placed in a waiting status, pending the next request from a terminal.

In step 350, the program makes provision to send back to the host terminal (T2) an equivalent ATR message stored or generated internally that the microcontroller µC1 executes. By means of this provision, the card is not reset unnecessarily and the transmitter terminal T2 can continue its session without waiting for the processing being performed by the card on a session of another terminal.

Figure 4:
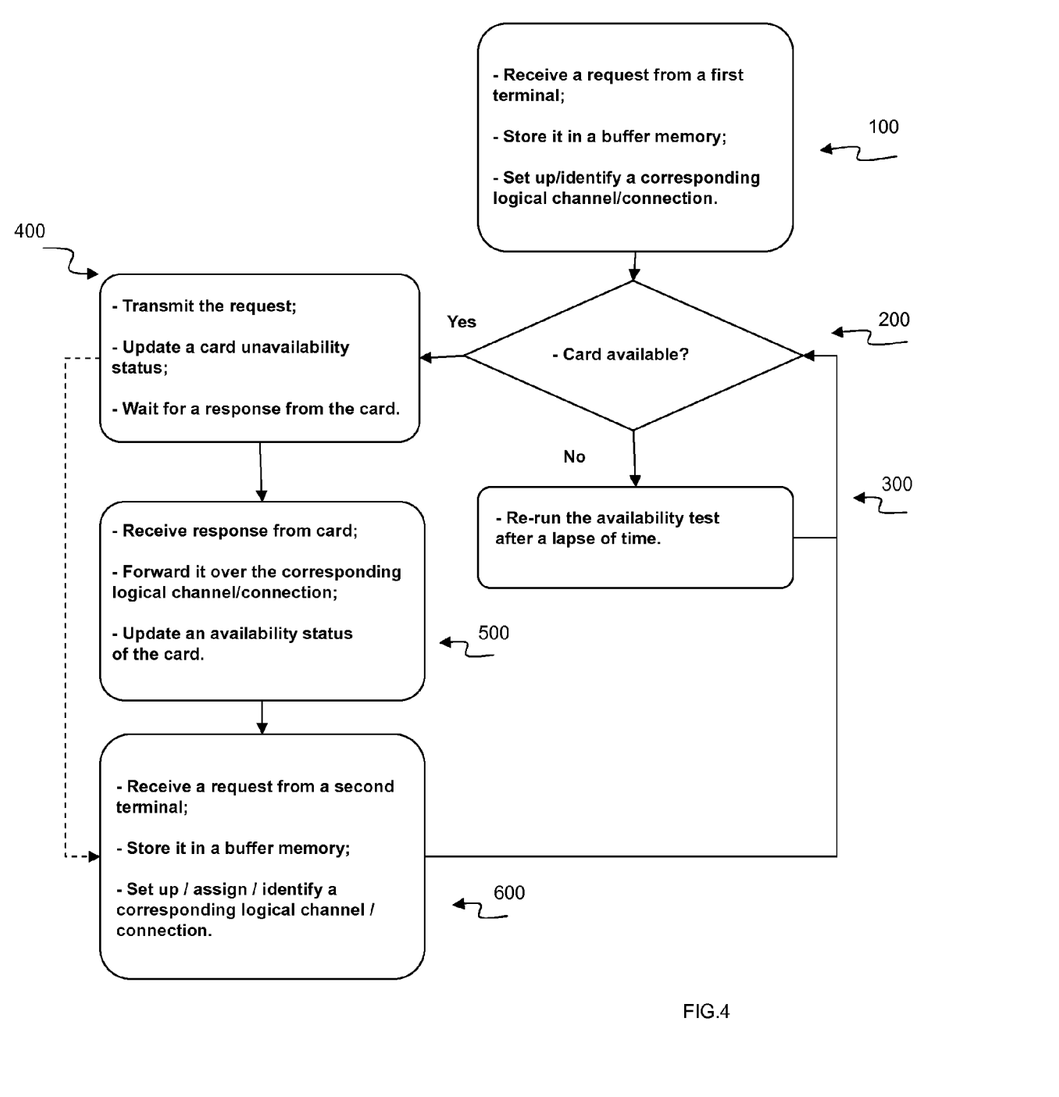
FIG. 4 shows the steps of the method of the invention relating to managing a plurality of streams in an implementation of the invention.

The flow chart of FIG. 4 shows the steps of the method of the invention (and/or of an internal program PCF1 of the stream control means) so as to explain operation of the invention in an embodiment, in particular, as shown in FIG. 1.

In step 100, the badge holder receives, via its Bluetooth reception means, a request from a first terminal T1 that is intercepted by the control and/or management means (GF1, 6). The request reaches the buffer memory where it remains at least temporarily stored for a lapse of time. The stream controller then sets up/identifies a corresponding logical channel/connection by using one of the methods explained above or known to the person skilled in the art.

Alternatively, in another implementation, when the card is unavailable, the request is not stored or kept to be transmitted at the appropriate time. The manager may transmit a signal of non-acknowledgement of receipt in such a manner as to enable the terminal to re-transmit its request. This non-availability message may be transmitted systematically, e.g. if a non-availability signal (bit or flag) is active in a dedicated register.

In step 200, the control means GF1 perform a test for checking whether the card is available. Various means such as those described above or such as those known to the person skilled in the art may be implemented. If the answer to the test is "no", the program goes to the following step 300, and if the answer is "yes", it goes to step 400.

In step 300, the program re-runs the above availability test after a lapse of time, and so on.

In step 400, the stream controller transmits the request in execution of the program to the card via the reader (LSC, 3). Simultaneously, preferably before, or else immediately after the transmission, the stream controller updates or indicates an unavailability status of the card by using means such as those described above or equivalent means known to the person skilled in the art. Then, the stream controller remains awaiting the response from the card after it has been processed. During this wait, two situations may occur as shown in step 500 and alternatively in step 600 depending on whether or not another terminal has intervened during a phase of unavailability of the card or during an unfinished session between a terminal and the card.

In step 500, the card has responded before being solicited by another terminal T2. The stream controller GF1 receives the response from the card via the reader LSC and forwards the response to the Bluetooth chip BT1. The response is directed over the same logical channel or connection corresponding to the one that was opened/identified during the reception in such a manner that the Bluetooth chip can transmit to the appropriate terminal. This channel and/or connection is/are determined by any one of the various methods explained above or by any other means known to the person skilled in the art.

When a Bluetooth chip BT1 is used, the stream controller may encapsulate the response or apply some other processing to it for the purpose of directing it to one of the two different RFCOMM channels in the Bluetooth chip.

The stream controller also updates the availability status of the card as above immediately, preferably as soon as the response is received or just before or after it is forwarded.

In step 600, since the card is unavailable, the badge holder starts a new communication session with another terminal T2 or receives the following sequence of a session in progress with said other terminal. A request is thus received from the terminal T2. This request reaches the buffer memory where it remains stored following on from any other waiting requests. The stream controller also, as in step 100, sets up/assigns a logical channel corresponding to said terminal or at least to said request. For example, it can also assign to it a number corresponding to an origin, to a particular path for the return or with specific attributes, in particular communication or pairing attributes.

The program then goes to the card availability test as described above, following on from step 100. If the test is positive (card available), the request coming from T2 is transmitted to the card, but otherwise the invention makes it possible not to perform premature transmission that might disturb the card.

The invention also makes it possible to have the card process as quickly as possible (as of detection of the card availability) the various data streams from the terminals T1, T2, without collision or with less risk of communication error.

In accordance with an additional characteristic, the invention makes provision for a second stream from a terminal T2 to be transmitted in any event to the card after a determined time allotted for the response to the first stream from a terminal T1. This provision of the invention makes it possible to avoid the interchanges of the second terminal T2 being blocked by a first terminal T1.

Optionally, a reset signal may be sent previously to the card before the stream from a second terminal is sent. An error message may be sent to the terminal by the controller at the end of a predetermined time.

The invention also provides a program that is embedded or designed to be embedded in a portable device (6, 16, PB1, PB2). This program is configured to enable at least two medium-range radiofrequency communication host terminals to communicate with an integrated circuit object in association with a portable device. This program includes, in particular, steps that are executable by a processing unit of the device and corresponding to the steps of one of the above-described methods. These steps may be taken independently from one another or in a different order.

The program may be integrated in the entire device or in some part thereof, and in particular in the communication chips or in the card reader portion.

The invention claimed is:

1. A method of controlling processing of a plurality of radiofrequency communication streams by an integrated circuit card, said streams coming from at least two terminals including at least a first host terminal and a second host terminal, said card being connected to a device equipped with radiofrequency communication means suitable for connecting to a plurality of host terminals for the purpose of receiving said communication streams, said method including the following step:

a reception and/or transmission control step for controlling reception of first and second data streams coming respectively from the first host terminal and from the second host terminal, and/or controlling transmission of the first and second data streams to the card, said control step including an availability checking step for checking whether the card is available before transmitting the second data stream to it.

2. A method according to claim 1, wherein the control step blocks reset requests when the card is not available and organizes sending back a response to the requests.

3. A method according to claim 1, wherein the method includes a control step for controlling a response from the card to the host terminal.

4. A method according to claim 3, wherein the response control includes an operation of redirecting the response from the card to the corresponding transmitter host terminal.

5. A method according to claim 3 wherein a logical communication channel is assigned/identified at each communication session opened with a host terminal or at each reception of a new stream.

6. A method according to claim 4, wherein, when use is made of a single communication chip capable of having a plurality of hosts, the method includes a step of keeping an indication of redirection in the chip.

7. A method according to claim 1, wherein, when use is made of a plurality of communication chips, the method performs a step of keeping an indication of the origins of the streams.

8. A method according to claim 1, wherein the second stream from the second host terminal is transmitted in any event to the card after a determined time allotted for the response to the first stream from the first host terminal.

9. A method according to claim 1, wherein the device includes a status register or a history of the streams transmitted to and/or received from the card.

10. A non-transitory computer-readable portable storage device containing a program said program being configured to have at least two medium-range radiofrequency communication host terminals communicate with an integrated circuit object in association with the portable device, said program including steps executable by a processing unit of the device and corresponding to the steps of the method according to claim 1.

11. A system for processing a plurality of radiofrequency communication streams by an integrated circuit card, said streams coming from at least two terminals including at least a first host terminal and a second host terminal, said card being connected to a device equipped with radiofrequency communication means suitable for connecting to a plurality of host terminals for the purpose of receiving said communication streams, said system comprising:

reception and/or transmission control means for controlling reception of first and second data streams coming respectively from the first host terminal and from the second host terminal, and/or controlling transmission of the data streams to the card, said reception and/or transmission control means being configured to perform an availability check for checking whether the card is available before transmitting the second data stream to it.

12. A processing control device for controlling processing of a plurality of radiofrequency communication streams by an integrated circuit object, said device being configured to communicate with radiofrequency communication means configured for connection to a plurality of host terminals that transmit said plurality of streams, the plurality of host terminals including at least a first host terminal and a second host terminal, said device including reception and/or transmission control means for controlling reception of first and second data streams coming respectively from the first host terminal and from the second host terminal, and/or controlling transmission of the data streams to the object, said reception and/or transmission control means being configured to perform an availability check for checking whether the object is available before transmitting the second data stream to it.

* * * * *